United States Patent

Fujii et al.

[11] Patent Number: 5,200,438
[45] Date of Patent: Apr. 6, 1993

[54] ULTRAVIOLET RAY-CURABLE INK

[75] Inventors: Toshihiro Fujii; Hiroki Nii; Makoto Ikeda, all of Fukuyama; Masao Etori, Nishikasugai; Ban Tanaka, Toyota, all of Japan

[73] Assignee: Hayakawa Rubber Co., Ltd., Japan

[21] Appl. No.: 815,579

[22] Filed: Dec. 30, 1991

Related U.S. Application Data

[63] Continuation of Ser. No. 652,483, Feb. 8, 1991, abandoned, which is a continuation of Ser. No. 247,372, Sep. 21, 1988, abandoned.

[30] Foreign Application Priority Data

Mar. 9, 1988 [JP] Japan ................................. 63-53680

[51] Int. Cl.$^5$ ........................ C08F 2/48; C08G 18/32; C08G 18/69
[52] U.S. Cl. ......................................... 522/96; 522/98
[58] Field of Search ................................... 522/96, 98

[56] References Cited

U.S. PATENT DOCUMENTS 3,855,379 12/1974 Araki et al. ............................ 522/96
4,422,914 12/1983 Tsao et al. ............................. 522/96

FOREIGN PATENT DOCUMENTS 0123525 7/1985 Japan.
2178436 2/1987 United Kingdom.

OTHER PUBLICATIONS

Derwent abstract of J 60123525-A Jul. 2, 1985.

Primary Examiner—Marion E. McCamish
Assistant Examiner—Susan Bermen
Attorney, Agent, or Firm—Parkhurst, Wendel & Rossi

[57] ABSTRACT

An excellent ultraviolet ray-curable ink for printing which shrinks little at the time of curing, and exhibits high adhesion, followability, aging-crack resistance, elasticity, elongation, tenacity, chemical resistance, and a scratch resistant property, by a novel ultraviolet ray-curable ink comprising by weight; 100 parts of an ultraviolet ray-curable rubbery copolymer having the general formula

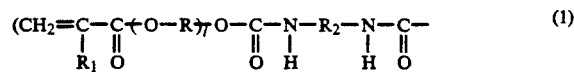

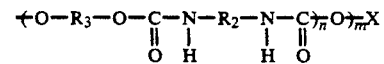

wherein R represents an alkylene group having 2-8 carbon atoms, $R_1$ is H or $CH_3$, $R_2$ is a residue of diisocyanate, $R_3$ is a residue of dihydric alcohol from which at least one or more hydroxyl group is removed, X is a moiety of dienic liquidus rubber having at least one or more hydroxyl groups from which at least one or more hydroxyl groups is removed, l is a number of 1–4, m is a number of $1.0 < m < 3.0$, n is a number of 1–12; 50–500 parts of at least one kind of mono or polyfunctional monomer; 0–300 parts of at least one kind of mono or polyfunctional photopolymerizable oligomer; and 1–30 parts of a photopolymerization initiator.

1 Claim, No Drawings

ULTRAVIOLET RAY-CURABLE INK

This is a continuation of application Ser. No. 07/652,483 filed Feb. 8, 1991, now abandoned which is a continuation of application Ser. No. 07/247,372 filed Sep. 21, 1988, now abandoned.

BACKGROUND OF THE INVENTION

1. Field of the Invention

The present invention relates to an ink, particularly to an ultraviolet ray-curable ink for printing.

2. Related Art Statement

Hitherto, many types of ultraviolet ray-curable ink are known, comprising a photo oligomer, a reactive diluent monomer, a photo initiator, a photosensitizer, a pigment, a pigment dispersant, and optional ink properties-imparting agents, such as a flow adjuster, a defoamer, and a levelling agent. However, the known inks have the following drawbacks.

When the inks are cured by irradiation with an ultraviolet ray, they suffer from cure shrinkages, so that adhesions of the inks to the adhered substances are deteriorated or lost. Even when the adhesions of the inks to the adhered substances are good, the adhered substances are frequently deformed due to handling, so that the cured inks become devoid of followability to the adhered substances, and bear an aging crack or cracks upon standing, only a small impact or bending force is exerted thereon.

SUMMARY OF THE INVENTION

Therefore, an object of the present invention is to obviate the aforementioned drawbacks of the prior art.

Another object of the present invention is to provide an ultraviolet ray-curable ink which has a splendid adhering property and chemical resistant property and which forms a stiff and tenacious coating ink.

For obviating the above drawbacks, the inventors made many studies and experiments leading to the present invention to find out that, if an ultraviolet ray-curable high molecular compound having a rubbery elastomer structure, a photopolymerizable monomer (photo monomer) or a photopolymerizable oligomer (photo oligomer) having a function of a reactive diluent, and a photopolymerization initiator (photo initiator) are reciped in a specific ratio, a splendid chemical resistant and stiff ink is obtained having low shrinkage at the irradiation with an ultraviolet ray, as well as eminent rubbery properties of post-cure elasticity, elongation, and the like properties.

The present invention is an ultraviolet ray-curable ink, comprising by weight; 100 parts of an ultraviolet ray-curable rubbery copolymer having the general formula

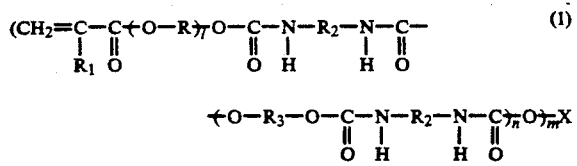

wherein R represents an alkylene groups having 2–8 carbon atoms, $R_1$ is H or $CH_3$, $R_2$ is a residue of diisocyanate, $R_3$ is a residue of dihydric alcohol from which at least one or more hydroxyl groups is removed, X is a moiety of dienic liquidus rubber having at least one or more hydroxyl group from which at least one or more hydroxyl group is removed, l is a number of 1–4, m is a number of $1.0<m<3.0$, n is a number of 1–12; 50–500 parts of at least one kind of mono or polyfunctional monomer; 0–300 parts of at least one kind of mono or polyfunctional photopolymerizable oligomer; and 1–30 parts of a photopolymerization initiator.

The constitutional components of the ink of the present invention will be explained in more detail below.

The ultraviolet ray-curable rubbery copolymer is obtained by uniformly mixing and reacting a dienic liquidus rubber having a molecular weight of about 1,000–10,000 and at least one hydroxyl or more group, a diisocyanate compound, a dihydric alcohol having a molecular weight of 300 or less, and a vinylic unsaturated monomer having at least one or more hydroxyl groups.

As the dienic liquidus rubber having a molecular weight of about 1,000–10,000 and at least one or more hydroxyl groups, use is made of, for example, a polymer having a number average molecular weight of about 1,000–10,000, such as 1,2-polybutadiene, 1,4-polybutadiene, 1,2-pentadiene, styrene-butadiene copolymer, acrylonitrile-butadiene copolymer, polyisoprene, or the like having at least one or more hydroxyl groups in the molecule. This is used alone or in admixture.

The valence m of the hydroxyl group in the molecule is about $1.0<m<3.0$. If $m \leq 1$, the resultant rubbery copolymer has too low of a photopolymerization density and the photocured product or ink is rather brittle. If $m \geq 3$, the photocured ink is too hard and has decreased, i.e., poor, elasticity.

As the vinylic unsaturated monomer having at least one or more hydroxyl group, use is made of, for example, 2-hydroxyethylacrylate, 2-hydroxyethylmethacrylate, 2-hydroxypropylacrylate, 2-hydroxypropylmethacrylate, tripropyleneglycolmonomethacrylate, etc., which may be used alone or in admixture.

As the diisocyanate compound, use is made of, for example, tolylenediisocyanate, xylylenediisocyanate, naphthalenediisocyanate, hexamethylenediisocyanate, isophoronediisocyanate, 4,4'-diphenylmethanediisocyanate, lysinediisocyanate, hydrated tolylenediisocyanate, or the like, which may be used alone or in admixture.

As the dihydric alcohol having a molecular weight of 300 or less, use is made of, for example, ethyleneglycol, diethyleneglycol, triethyleneglycol, 1,2-propyleneglycol, 1,3-propyleneglycol, 1,3-butanediol, 1,4-butanediol, 1,5-pentanediol, 1,6-hexanediol, dioxaneglycol (trade name, produced by Mitsubishi Gas Kagaku Co.), trimethylolpropanemonoacrylate, trimethylolpropane-methacrylate, glycerol α-mono-allylether, etc., which may be used alone or in admixture.

The above four components are mixed uniformly at a temperature of 40°–70° C., preferably at 50°–60° C., in nitrogen atmosphere, to obtain the rubbery copolymer used in the present invention.

As the photopolymerizable monomer used in the present invention, use is made of either a monofunctional or polyfunctional monomer, for example, acrylic or methacrylic esters of $C_1$–$C_{12}$ alcohol having a side chain, such as methylacrylate, methylmethacrylate, ethylacrylate, ethylmethacrylate, butylacrylate, butylmethacrylate, 2-ethylhexylacrylate, 2-ethylhexylmethacrylate, laurylacrylate or laurylmethacrylate; polyolpolyacrylates or polyolpolymethacrylates, such as trimethylolpropanediacrylate, trimethylolpropanetriacrylate, trimethylolpropanetrimethacrylate, neopentylglycoldiacrylate, neopentylglycolmethacrylate, 1,6-hexanedioldiacrylate, or 1,6-hexanedioldimethacrylate; alkylsubstituted aminoalcohols or alkylsubstituted aminoalcoholmethacrylates, such as diethylaminoethylacrylate or diethylaminoethylmethacrylate; acrylamides or acrylimides, such as N-acryloylmorpholin; and N vinyl-2-pyrrolidone, etc., which may be used alone or in admixture.

At least one of the above photopolymerizable monomers in an amount of 50–500 parts by weight is reciped with 100 parts by weight of the ultraviolet ray-curable rubbery copolymer. If the amount of the photopolymerizable monomer is less than 50 parts by weight, the viscosity of the ink is too high. While, if the amount of the monomer exceeds 500 parts by weight, the desired rubbery elasticity of the ink can not be attained.

As the optional photopolymerizable oligomer, use is made of usually used epoxyacrylate series oligomer, polyesteracrylate series oligomer, urethaneacrylate series oligomer having at least 2 functionalities.

At least one of the above photopolymerizable oligomers is reciped with the above ultraviolet ray-curable rubbery copolymer in a usually used amount, namely, 0–300 parts by weight, relative to 100 parts by weight of the rubbery copolymer. If the amount exceeds 300 parts by weight, the desired good rubbery elasticity of the ink can not be obtained.

Many of the above photopolymerizable monomers and oligomers are useful at low viscosity as photopolymerizable diluents.

As the photopolymerization initiator, use is made of benzoin, benzoinalkylether, benzyldimethylkethal, benzophenone, Michler's ketone, azoisobutyronitrile, 1-azobis-1-cyclohexanecarbonitrile, naphthalenesulfonylchlorides, anthraquinones, biimidazoles, or thioxartones, which may be used alone or in admixture.

At least one of the above initiators is reciped with the above ultraviolet ray-curable rubbery copolymer in a usually used amount, i.e., 1–30 parts by weight, relative to 100 parts by weight of the rubbery copolymer. If the amount of the initiator is less than 1 part by weight, the curing property of the ink is inferior. While, if the amount of the initiator exceeds 30 parts by weight, the cost of the ink is too expensive.

In reciping the components for producing the ink, other usually used components may be optionally reciped, such as sensitizers like tertiary amines, organic or inorganic pigments, pigment dispersants, flow adjusters which afford suitable printability, defoamers, and leveling agents, depending on the use of the ink.

Illustrative examples of the sensitizer are 4-methylaminobenzoic acid isoamyl ester, and azidepyren, which may be used in an amount of 1–15 parts by weight relative to 100 parts by weight of the rubbery elastomer.

Illustrative examples of the pigment dispersant are polyamide, and a salt of an ester of a polar acid and a long chain polyaminoamide, which may be used in an amount of 0.1–4 parts by weight relative to 100 parts by weight of the rubbery copolymer.

Illustrative examples of the flow adjuster are methylpolysiloxane, and a modified acryl polymer, which may be used in an amount of 1–10 parts by weight relative to 100 parts by weight of the rubbery copolymer.

Illustrative examples of the defoamer are hydrophobic polysiloxane/polyether copolymer, and a compound of dimethylpolysiloxane and silisic acid, which may be used in an amount of 1–10 parts by weight relative to 100 parts by weight of the rubbery copolymer.

Illustrative examples of the levelling agent are polysiloxane/polyether copolymer, and a modified organic polysiloxane, which may be used in an amount of 1–10 parts by weight relative to 100 parts by weight of the rubbery copolymer.

The pigment may be inorganic and/or organic, and may be used in an amount of 1–40 parts by weight relative to 100 parts by weight of the rubbery copolymer.

The above reciped components which constitute the raw materials of the ink are mixed and dispersed uniformly by an appropriate means such as a roller mill, to obtain the ultraviolet ray-curable ink of the present invention.

The ultraviolet ray-curable ink of the present invention adheres well to the adhered substance, shows no removal or peeling off from the intersurface of the adhered substance caused by the stress strain, exhibits an excellent followability to the deformation of the adhered substance, and endures well strong and rapid physical shocks, such as punch-out processing or bend processing of the adhered substance after printing the ink.

DESCRIPTION OF THE PREFERRED EMBODIMENTS

Hereinafter, the present invention will be explained in more detail with reference to examples, which, however, should not be construed by any means as limitations of the present invention.

In the examples, all the numerals of quantity are shown by weight basis.

EXAMPLES 1-4

An ultraviolet ray-curable rubbery copolymer having a trade name of 12B-A or NU-A (photosensible rubber "Mickelon UV" produced by Hayakawa Rubber Co.) was preliminarily dissolved in N-vinyl-2-pyrrolidone having a trade name of NVP (produced by GAF Corp.) in reciping ratios as shown in the following Table 1, added and mixed thoroughly with other raw materials, agitated, and blended two times on three rolls to obtain ultraviolet ray-curable inks.

Thus obtained inks were tested as inks for screen printing, as follows.

A screen printing was effected by depicting a nega picture of an emulsion thickness of 10 μm on a 250 mesh screen made of tetron, and printing the picture on a polycarbonate resin sheet of 0.5 mm thickness. The printed sheet on a conveyer of a speed of 5 m/min was irradiated by an ultraviolet ray emanated from 80 W/cm high pressure mercury vapor discharge lamps of type HMW 180 produced by Oak K.K. at a distance of 120 mm, to obtain a cured coating of a thickness of 8 μm. The cured coating on the sheet was used as a test piece. The test pieces were tested on adhesion by a tessellate plastic tape-peeling test, flexibility and elongation by a 180° bending test, and wear-resistant property by a nail scratch test. The results are shown in Table 1.

REFERENTIAL EXAMPLES 1-2

The procedures of Example 1 were repeated using the recipes as shown in Table 1, except that urethaneacrylate oligomer (trade name "Aronix M-1200") was used instead of the photosensible rubber (trade name "12B-A" or "NU-A"). The results are shown in Table 1.

TABLE 1(a)

| Component | Example 1 | Example 2 | Example 3 | Example 4 | Reference Example 1 | Reference Example 2 |
|---|---|---|---|---|---|---|
| (1) Photosensible rubber (12B-A) | 100 | 100 | — | — | — | — |
| (2) Photosensible rubber (NU-A) | — | — | 100 | 100 | — | — |
| (3) Urethaneacrylate oligomer (Aronix M-1200) | — | — | — | — | 100 | 100 |
| (4) N-vinyl-2-pyrrolidone | 100 | 50 | 100 | 50 | 100 | 50 |
| (5) Ethylcarbitol-acrylate | 50 | 100 | 50 | 100 | 50 | 100 |
| (6) Trimethylolpropanetriacrylate | 50 | 50 | 50 | 50 | 50 | 50 |
| (7) Benzyldimethylkethal | 15 | 15 | 15 | 15 | 15 | 15 |
| (8) Talc | 20 | 20 | 20 | 20 | 20 | 20 |
| (9) S-024 | 4 | 4 | 4 | 4 | 4 | 4 |
| (10) Phthalocyanine blue | 15 | 15 | 15 | 15 | 15 | 15 |
| (11) Antiterra U | 1 | 1 | 1 | 1 | 1 | 1 |
| Total | 370 | 370 | 370 | 370 | 370 | 370 |

TABLE 1(b)

| Test | Example 1 | Example 2 | Example 3 | Example 4 | Reference Example 1 | Reference Example 2 |
|---|---|---|---|---|---|---|
| Tesselate plastic tape-peeling test | 100/100 2Φ | 100/100 2Φ | 100/100 2Φ | 100/100 2Φ | 20/100 8Φ | 30/100 8Φ |
| 180° bending test | good | good | good | good | cracked | deviation of coating from the sheet |
| Wear resistant property | good | good | good | good | peeled | damaged |

Notes:
(1) Mickelon UV, produced by Hayakawa Rubber Co. Ltd.
(2) Mickelon UV, produced by Hayakawa Rubber Co. Ltd.
(3) Produced by Toa Gosei Kagaku Kogyo
(4) NVP, produced by GAF Inc.
(5) EC-A, produced by Kyoeisha Yushi Company
(6) TMPTA, produced by Shin Nakamura Kagaku K.K.
(7) Irgacure 651, produced by CIBA Geigi Co.
(8) Mistron vapor talc, produced by Mistron Co.
(9) Levelling Agent, produced by German Additive Co.
(10) Pigment, produced by Dainichi Seika Co.
(11) Pigment dispersant, produced by BYK, Chemie Co.

As clearly seen from the aforegoing description, the ultraviolet ray-curable ink of the present invention contains the ultraviolet ray-curable rubbery copolymer of formula (1), so that the ink exhibits a low shrinkage at the time of curing by an irrradiation with an ultraviolet ray, a splendid adhesion to the adhered substance, an excellent followability to bending or elongation of the particularly flexible adhered substance, a superior surface scratch resistant property, a tenacious or abrasive resistant property, and a remarkably good chemical resistance to corrosive chemical substances, such as acids or caustic materials.

Although the present invention has been explained with specific examples, it is of course apparent to those skilled in the art that various changes and modifications thereof are possible without departing from the broad spirit and aspect of the present invention as defined in the appended claims.

What is claimed is:

1. An ultraviolet ray-curable ink comprising by weight:

100 parts by weight of an ultraviolet ray-curable rubbery copolymer having the general formula (1):

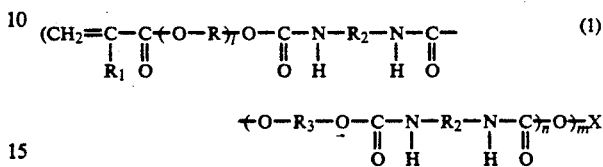

wherein R represents an alkylene group having 2–8 carbon atoms, $R_1$ is selected from the group consisting of H and $CH_3$, $R_2$ is a residue of diisocyanate, $R_3$ is a residue of dihydric alcohol, X is a residue of dienic liquid rubber having at least one hydroxyl group, l is a number of 1–4, m is a number ranging from $1.0 < m < 3.0$ and n is a number of 1–12;

50–500 parts of at least one mono or polyfunctional monomer selected from the group consisting of acrylic or methacrylic esters of $C_1$–$C_{12}$ alcohol having a side chain, alkylsubstituted aminoalcohols, alkylsubstituted aminoalcoholmethacrylates, acrylamides, acrylimides and N-vinyl-2-pyrrolidone;

at least one kind of urethaneacrylate polyfunctional photopolymerizable oligomer having at least 2 acrylate groups present in an amount of up to 300 parts; and 1–30 parts of a photopolymerization initiator.

* * * * *